United States Patent [19]

Tsuyuguchi et al.

[11] Patent Number: 4,658,307
[45] Date of Patent: Apr. 14, 1987

[54] DATA TRANSFER APPARATUS FOR USE WITH A FLEXIBLE MAGNETIC DISK OR THE LIKE

[75] Inventors: Hiroshi Tsuyuguchi, Tokyo; Shozo Toma, Kokubunji, both of Japan

[73] Assignee: Teac Corporation, Tokyo, Japan

[21] Appl. No.: 642,050

[22] Filed: Aug. 17, 1984

[30] Foreign Application Priority Data

Sep. 14, 1983 [JP] Japan .................. 58-170946

[51] Int. Cl.$^4$ .............................................. G11B 5/012
[52] U.S. Cl. ........................................ 360/69; 360/71; 360/73; 360/75
[58] Field of Search ................ 360/69, 71, 73, 75, 360/74.5, 74.6

[56] References Cited

U.S. PATENT DOCUMENTS

| | | | |
|---|---|---|---|
| 3,678,481 | 7/1972 | Dalziel et al. | 340/174.1 C |
| 3,864,744 | 2/1975 | Uemura | 360/96 |
| 4,089,029 | 5/1978 | Castrodale et al. | 360/99 |
| 4,318,139 | 3/1982 | Shibata et al. | 360/71 |
| 4,359,763 | 11/1982 | Hoffman | 360/99 |
| 4,376,293 | 3/1983 | Teramura et al. | 360/71 |
| 4,458,273 | 7/1984 | Johnson | 360/69 |
| 4,519,011 | 5/1985 | Bowden | 360/137 |

FOREIGN PATENT DOCUMENTS

| | | | |
|---|---|---|---|
| 55-4731 | 1/1980 | Japan | 360/71 |
| 56-134357 | 10/1981 | Japan | 360/99 |
| 58-1856 | 1/1983 | Japan | 360/99 |
| 58-211359 | 12/1983 | Japan | 360/137 |
| 59-116959 | 7/1984 | Japan | 360/137 |

OTHER PUBLICATIONS

Patent Abstracts of Japan, vol. 4, No. 160 (p. 35) 642 55-108963 21.8/80 Murakami, Drive Control Circuit of Motor for Floppy Disc.

Primary Examiner—George G. Stellar
Attorney, Agent, or Firm—Woodcock Washburn Kurtz Mackiewicz & Norris

[57] ABSTRACT

A data transfer apparatus is disclosed as typified by a floppy disk drive which, together with one or more like devices, is daisy chained to a central processor unit via a controller. Each disk drive comprises a disk motor for driving a record disk under the control of a disk motor drive circuit, a head motor for incrementally moving a transducer head radially of the record disk under the control of a head motor drive circuit, and a read/write circuit for processing data read from, or to be written on, the record disk via the transducer head. Also included in each disk drive is a sensor control circuit associated with an optical sensor assembly for producing a DISK PRESENCE signal representative of the presence or absence of the record disk in the disk drive. In order to avoid waste of power, at least one, preferably all, of the disk motor drive circuit, head motor drive circuit, and read/write circuit is connected to an external power line via a power control switch which is closed in response to the DISK PRESENCE signal only when the record disk is loaded in the disk drive. Additional embodiments are disclosed wherein the power control switch responds not only to the DISK PRESENCE signal but also to a standard MOTOR ON signal or DRIVE SELECT signals, or to both, which are supplied from the host equipment.

9 Claims, 13 Drawing Figures

DATA TRANSFER APPARATUS FOR USE WITH A FLEXIBLE MAGNETIC DISK OR THE LIKE

BACKGROUND OF THE INVENTION

Our invention relates generally to apparatus employing disklike record media for the recording and/or reproduction of data, and in particular to apparatus for data transfer with flexible magnetic disks now commonly referred to as floppy disks, although we do not wish our invention to be unnecessarily limited to this particular type of record medium. The data transfer apparatus in accordance with our invention particularly features power saving facilities.

Floppy disks have found widespread acceptance in information processing and allied industries, as well as in offices in general, as compact data storage media. Being thin and limply flexible, the disks are usually encased in more rigid, apertured envelopes to make up disk assemblies or cartridges that are self supporting. There have also been suggested and used a variety of devices, known as floppy disk drives (FDDs), for data transfer to and from such disk cartridges. Dalziel et al. U.S. Pat. No. 3,678,481 and Castrodale et al. U.S. Pat. No. 4,089,029 represent examples of such known FDDs.

Usually FDDs are not self contained; they are subservient to host equipment typically comprising a central processor unit (CPU) and a controller. A familiar example of such mode of use is the daisy changing of two or more FDDs to a CPU via a controller, with the FDDs connected in parallel with each other. Each of the daisy chained FDDs has no power switch of its own; instead, a single power switch serves the complete system comprising the CPU, controller, and FDDs.

A problem has existed with this standardized power supply system. Not all the daisy chained FDDs are used for data transfer at one time, nor is any one FDD necessarily used for data transfer at all times, after the complete system is switched on. Conventionally, however, power has been fed to the various components of the FDDs even when they are not in actual use. This of course has incurred a substantial waste of energy.

SUMMARY OF THE INVENTION

We object to that waste of energy and hereby propose an improved data transfer apparatus that has realized a remarkable curtailment of power consumption in a simple and readily practicable manner and without in any way sacrificing the normal operation of the apparatus.

Stated briefly, the improved data transfer apparatus of our invention comprises a first motor controllably driven by a first drive circuit for imparting rotation to a disklike record medium in a preassigned data transfer position, a second motor controllably driven by a second drive circuit for moving a transducer radially of the record medium in data transfer relation therewith, and a read/write circuit connected to the transducer for processing data read from, or to be written on, the record medium. Also included are sensor means, connected directly to power supply means, for sensing the loading and unloading of the record medium into and out of the apparatus and producing a DISK PRESENCE signal indicative of the presence or absence of the record medium in the apparatus. At least one (preferably all) of the first and second drive circuits and the read/write circuit is connected to the power supply means via power control switch means, which is further connected to the sensor means for actuation by the DISK PRESENCE signal depending upon whether the record medium is loaded in or unloaded from the apparatus. The power control switch means functions to hold the selected one (or all) of the first and second drive circuits and the read/write circuit disconnected from the power supply means when the record medium is not loaded in the apparatus.

Data transfer between record medium and transducer is of course impossible unless the record medium is loaded in the apparatus. Thus, even if the apparatus is switched on, not all its components need to be powered when the record medium is not loaded therein. The first and second drive circuits and the read/write circuit are normally required to operate only during the progress of data transfer. Any one or more of these circuits may therefore be connected to the power supply means via the power control switch means so as to be powered only when the record medium is loaded in the apparatus. A substantial saving of power can thus be realized. Any other standard component of the apparatus that need not operate when the record medium is unloaded may likewise be connected to the power supply means via the power control switch means.

Some components, however, should necessarily or advantageously be powered even when the record medium is not loaded. These components may be coupled directly to the power supply means. An example of such components is the sensor means as the same must sense the loading of the record medium. Another example is an interface unit if the apparatus is interfaced with host equipment.

Our invention is disclosed herein as adapted for a multiple data transfer system having a plurality of FDDs interfaced with and daisy chained to a CPU via a controller. In this application each FDD has conventionally been equipped with the sensor means for the production and delivery of the DISK PRESENCE signal to the host equipment. Accordingly our invention requires no substantial alteration of the existing parts of the FDDs, or of the complete data transfer system, other than the provision of the power control switch means and associated electrical connections for the actuation thereof by the DISK PRESENCE signals.

In additional embodiments of our invention also disclosed herein, the power control switch means of each FDD responds not only to the DISK PRESENCE signal but also to a MOTOR ON signal, to a DRIVE SELECT signal, or to both, for a still greater saving of power. These signals have also been conventionally supplied from the host equipment to the FDDs for their automatic operation. Thus, in these additional embodiments, too, the objectives of our invention are attained in a simple and readily practicable manner.

The above and other features and advantages of our invention and the manner of realizing them will become more apparent, and the invention itself will best be understood, from a study of the following description and the appended claims, with reference had to the attached drawings showing some preferable embodiments of our invention.

DESCRIPTION OF THE PREFERRED EMBODIMENTS

Figure 1:
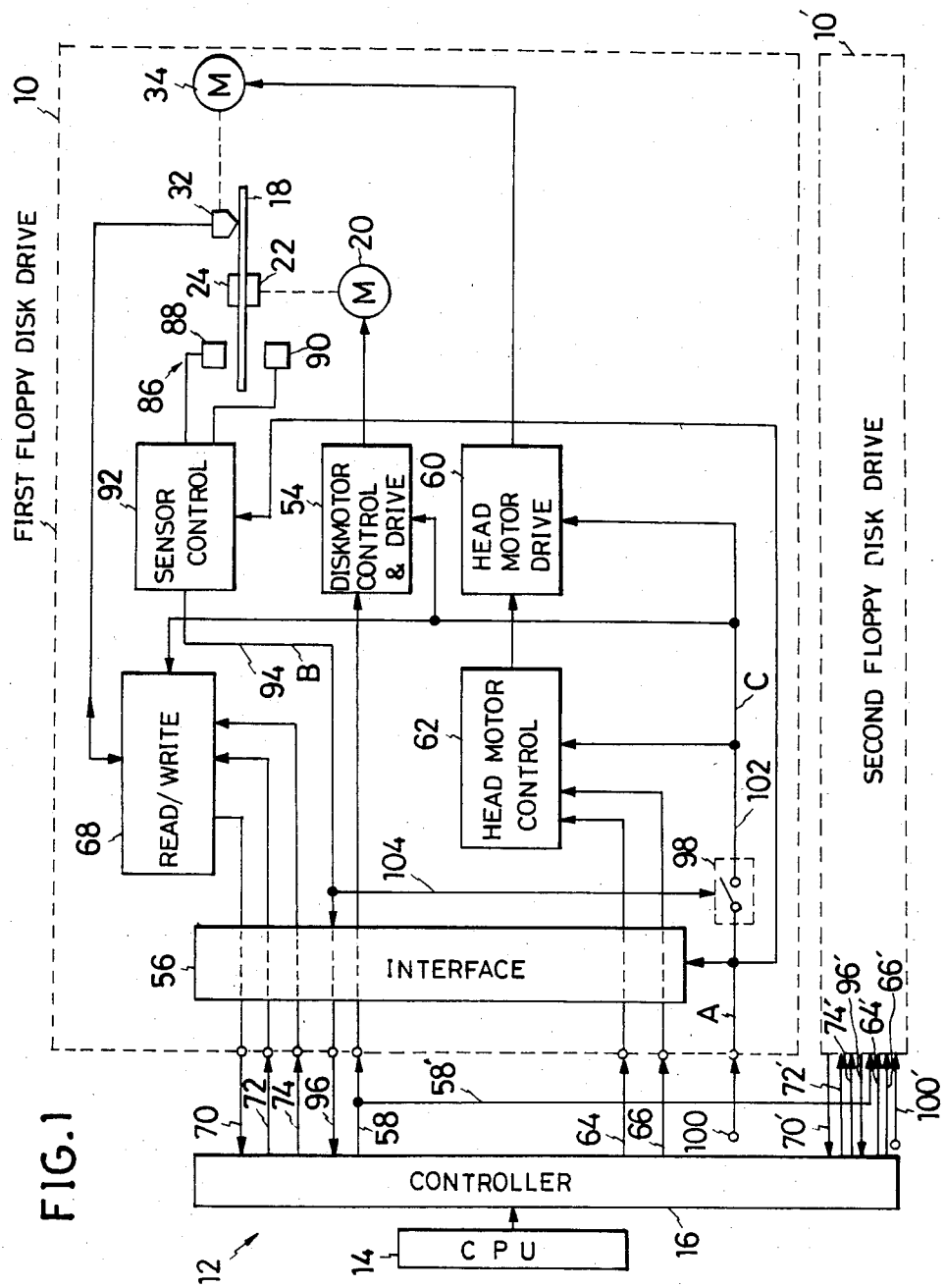
FIG. 1 is a block diagram of the multiple data transfer system embodying the principles of our invention, with the system comprising a plurality of daisy chained FDDs each having a flexible magnetic disk cartridge loaded therein for selective data transfer, each FDD having a power control switch actuated by a DISK PRESENCE signal.

We have illustrated in FIG. 1 the apparatus of our invention as adapted for a multiple data transfer system which, we believe, represents the best mode of carrying out our invention. The multiple data transfer system comprises a plurality of, two in the illustrated embodiment, FDDs 10 and 10' daisy chained to host equipment 12 composed of a CPU 14 and a controller 16. The CPU 14 is per se well known in the art. The controller 16 is also a standard component in this type of data transfer system. Generally referred to as an FDD controller, it functions to deliver and receive a variety of signals to and from the FDDs 10 and 10' in a manner more fully set forth hereafter. Suffice it to say, therefore, that the controller 16 broadly comprises an interface for interaction with the CPU 14, a controller/formatter section, and another interface for interaction with the FDDs 10 and 10'.

The two FDDs 10 and 10' are of like construction. We will therefore describe only the first FDD 10 in detail, it being understood that the same description applies to the second FDD 10'.

The representative FDD 10 is shown to have loaded therein a replaceable floppy disk cartridge 18 having a magnetic disk for rotation by an electric motor 20 via a rotor 22. A displaceable clamp 24 overlies the rotor 22 for clamping the magnetic disk onto the rotor in a preassigned data transfer position within the FDD 10.

Figure 2:
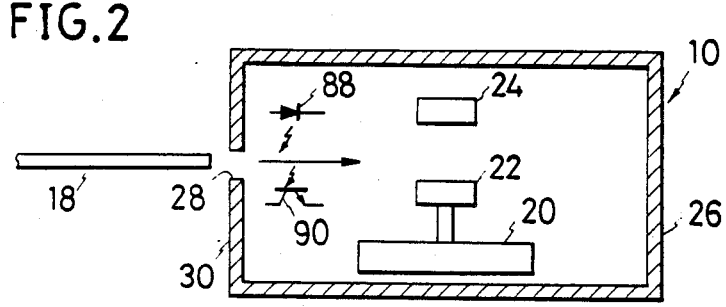
FIG. 2 is a diagrammatic section through each of the daisy chained FDDs of FIG. 1, showing in particular the arrangement of the disk drive mechanism and optical sensor assembly.

As diagrammatically shown in FIG. 2, the clamp 24 holds the magnetic disk against the rotor 22 as the disk cartridge is inserted in the housing 26 of the FDD 10 through an entrance slot 28 in its front face 30. We have not illustrated the details of the disk drive mechanism, the clamp mechanism comprising the clamp 24, or the means for guiding the disk cartridge to the data transfer position within the housing 26, as such means can all be conventional and do not constitute features of our invention.

With reference back to FIG. 1 we have illustrated for the convenience of description the disk cartridge 18 to be single sided, rather than double sided, with only one magnetic transducer head 32 disposed on one side thereof for data transfer therewith. The transducer head 32 is mounted on a carriage, not shown, for movement therewith more or less in a radial direction of the magnetic disk for track to track accessing. Employed for such radial travel of the transducer head is another electric motor 34 of the bidirectional stepping type having, for example, four phase windings to be excited in a controlled sequence to cause stepwise rotation of the motor.

We will hereinafter refer to the first recited motor 20 as the disk motor, and to the second motor 34 as the head motor, by way of contradistinction from each other. While the disk motor 20 may directly drive the magnetic disk via the rotor 22, the head motor 34 must be coupled to the unshown head carriage via a rotary to linear converter, also not shown, of any known or suitable construction.

Figure 3:
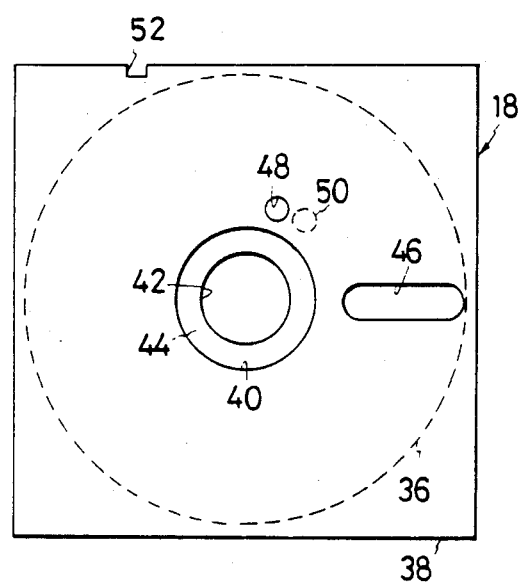
FIG. 3 is a plan view of a typical form of the flexible magnetic disk cartridge for use with each FDD of the data transfer system of FIG. 1.

Reference is now directed to FIG. 3 in order to explain a typical construction of the floppy disk cartridge 18 for use with the FDD 10. It has the aforesaid flexible magnetic disk 36 enclosed in a square envelope 38. This envelope has in each of its opposite surfaces a central aperture 40 larger than a concentric central aperture 42 in the disk 36, so that an annular portion 44 of the disk is exposed. The disk 36 is to have this exposed portion 44 engaged between rotor 22 and clamp 24 for rotation by the disk motor 20. The envelope 38 also has an elliptical opening 46 that serves to expose a radial portion of the disk 36. The transducer head 32 is to make data transfer contact with this exposed radial portion of the disk. Further a small hole 48 is formed through both surfaces of the envelope 38. When the disk 36 rotates within the envelope 38, an index hole 50 in the disk comes into register with the hole 48 at intervals and so allows passage of light or other radiation to generate an electric pulse signal. A notch 52 in a marginal edge of the envelope 38 is to be masked by the user against the passage of radiant energy if he wishes to protect the information on the disk 36 against inadvertent erasure.

Referring again to FIG. 1, we will now describe the electrical details of the FDD 10. The disk motor 20 is connected to a disk motor control and drive circuit 54 to be controllably driven thereby. The disk motor control and drive circuit 54 includes feedback control means for holding the rotation of the disk motor 20 at a prescribed constant speed in response to an input signal representative of the actual speed of the disk motor, and drive means for energizing the disk motor under the control of the feedback control means.

The disk motor control and drive circuit 54 is connected via an interface 56 to the controller 16 of the host equipment 12 to receive therefrom the standard MOTOR ON signal by way of a line 58. It will be seen that the line 58 has a branch line 58' connected to the second FDD 10'. Thus the MOTOR ON signal is common to all the daisy chained FDDs and has heretofore been used to set all their disk motors into and out of rotation simultaneously. In this embodiment of our invention, however, the disk motor control and drive circuits 54 of each FDD does not directly respond to the MOTOR ON signal, as will become apparent as the description proceeds.

The head motor 34 is connected to a head motor drive circuit 60 to be controllably driven thereby. If the head motor 34 is a four phase stepping motor, as we have assumed above, then the head motor drive circuit 60 may comprise four switching transistors for selectively energizing the four sets of windings of the head motor.

The head motor drive circuit 60 is itself under the control of a head motor control circuit 62. This control circuit 62 functions to deliver four phase drive control signals to the head motor drive circuit 60 in order to cause therethrough the bidirectional, incremental rotation of the head motor 34 in a desired manner. Conventionally included in the head motor control circuit 62 is an up/down counter which is connected via the interface 56 to the controller 16 to receive therefrom a DIRECTION SELECT signal and a STEP signal by way of lines 64 and 66 respectively. As the name implies, the DIRECTION SELECT signal determines the direction in which the transducer head 32 is to be moved by the head motor 34, that is, either radially inward or outward of the disk cartridge 18. The STEP signal dictates the extent (the number of tracks on the magnetic disk) to which the transducer head 32 is to be moved in either direction. The head motor drive circuit 60 responds to these input signals by generating the noted four phase drive control signals accordingly, for delivery to the head motor drive circuit 60.

The transducer head 32 is connected to a read/write circuit 68. Since the illustrated data transfer system is equipped for both introduction and recovery of data to and from the disk cartridge 18, the read/write circuit 68 functions both to direct the data that has been read from the disk cartridge by the transducer head 32 to the controller 16 via the interface 56 and a line 70, and to send the data to be written, which has been delivered from the controller by way of a line 72, on to the transducer head. The read/write circuit 68 is further connected via the interface 56 to the controller 16 by way of another line 74 to input a DRIVE SELECT signal. The DRIVE SELECT signal controls the passage of the outgoing and incoming data through the read/write circuit 68 in a manner that will become apparent from the following description of FIG. 4.

Figure 4:
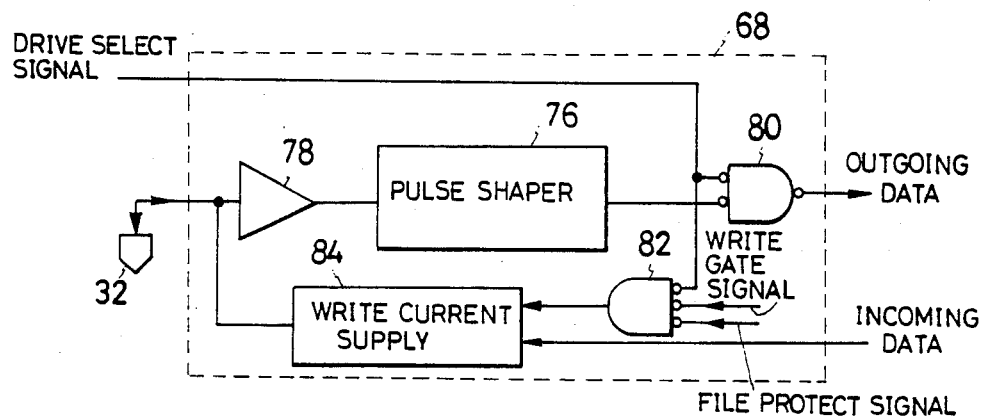
FIG. 4 is a block diagram showing in greater detail the read/write circuit in each FDD of the data transfer system of FIG. 1.

FIG. 4 is a more detailed, although still somewhat schematic, illustration of the read/write circuit 68. Included in this circuit is a pulse shaper 76 connected to the transducer head 32 via a read amplifier 78. The data recovered from the disk cartridge by the transducer head 32 is amplified by the read amplifier 78, and the amplified replica of the recovered data enters the pulse shaper 76 thereby to be shaped into a form suitable for further processing. Connected to the output of the pulse shaper 76 is an AND type OR gate 80, having another input connected to receive the DRIVE SELECT signal from the controller output line 74 via the interface 56. The output of this OR gate is connected via the interface 56 to the controller input line 70.

Consequently the OR gate 80 allows the passage of the recovered data therethrough, toward the controller 16, only when the DRIVE SELECT signal is low. The OR gate 80 may therefore be called a data select gate.

Also included in the read/write circuit 68 is another data select gate in the form of an AND type NOR gate 82 designed to control the passage through the circuit 68 of data to be written on the disk cartridge. The NOR gate 82 has three inputs, one for receiving the DRIVE SELECT signal from the controller 16 by way of its output line 74, another for receiving a WRITE GATE signal from the controller, and still another for receiving an internally generated FILE PROTECT signal. The WRITE GATE signal goes low when the data already written on the disk may be erased for the introduction of new data. The FILE PROTECT signal, on the other hand, goes high when the notch 52, FIG. 3, in the disk cartridge envelope 38 is masked against the passage of radiant energy to inhibit the erasure of the recorded data. The output of the NOR gate 82 is connected to a write current supply circuit 84, to which there is also connected via the interface 56 the controller output line 72 for the delivery of data to be written. The output of the write current supply circuit 84 is connected directly to the transducer head 32.

Thus the output from the NOR gate 82 goes high when the three input signals, the DRIVE SELECT signal, WRITE GATE signal, and FILE PROTECT signal, all go low. This high output from the NOR gate 82 enables the write current supply circuit 84 to deliver a write current, representative of the desired data to be written on the magnetic disk, to the transducer head 22.

The reference numeral 86 in FIG. 1 generally denotes a disk sensor assembly for sensing the presence or absence of the disk cartridge 18 within the FDD 10. As will be seen also from FIG. 2, the disk sensor assembly comprises a light source 88 and a photodetector 90, disposed on the opposite sides of the predetermined path of travel of the disk cartridge 18 into and out of the FDD housing 26 through the entrance slot 28. Therefore, upon insertion of the disk cartridge 18 in the entrance slot 28, the radiation emitted by the light source 88 is thereby shielded and prevented from impinging upon the photodetector 90. Upon withdrawal of the disk cartridge 18 from within the FDD housing 26, on the other hand, the light source 88 is allowed to irradiate the photodetector 90.

The light source 88 and photodetector 90 of the disk sensor assembly 86 are both electrically connected to a sensor control circuit 92. The sensor control circuit supplies an electric current to the light source 88 and responds to the electric output from the photodetector 90. The sensor control circuit 92 has an output line 94 connected to the interface 56 and thence to the controller 16 by way of a line 96. The output from the sensor control circuit 92 goes low when the light source 88 of the disk sensor assembly 86 is prevented from irradiating the photodetector 90 upon insertion of the disk cartridge 18 into the FDD housing 26, and high when the light source 88 irradiates the photodetector 90 upon withdrawal of the disk cartridge from within the FDD housing. This output from the sensor control circuit 92 is what we call the DISK PRESENCE signal, which plays an important role in the data transfer apparatus of our invention.

Standard FDDs of this type are normally additionally furnished with: (1) a "file protect" sensor assembly for sensing from the notch 52, FIG. 3, in the disk cartridge envelope 38 whether data may be written on the disk or not; (2) an index sensor assembly for sensing the angular position of the magnetic disk 36, FIG. 3, from the index hole 50 moving into and out of register with the hole 48 in the disk envelope 38; (3) a "track zero" sensor assembly for sensing the "track zero" position of the transducer head 32 on the magnetic disk; and (4) a "disk side" sensor assembly for sensing the front and rear sides of the disk cartridge. We have not illustrated these additional sensor assemblies because they fall outside the purview of our invention.

A further standard component in this type of FDD in general is a "ready" circuit, also not shown, to which there are input the aforesaid DISK PRESENCE signal and the INDEX signal, the latter being indicative of the state of rotation of the magnetic disk. From these input signals the "ready" circuit determines whether or not the magnetic disk is ready for the commencement of writing or reading. The READY output signal from this circuit, conveying that information, is delivered to the controller 16.

At 98 in FIG. 1 is shown a power control switch constituting a feature of our invention. The power control switch 98 is connected between an external power line 100 conducting electric power to the FDD 10 and an internal power line 102 leading to some selected components of the FDD. The power control switch 98 further has an actuating signal line 104 branching off from the output line 94 of the sensor control circuit 92, in order to be turned on and off by the DISK PRESENCE signal.

The external power line 100 is connected to a supply circuit, not shown, serving the complete data transfer system comprising the CPU 14, controller 16, and FDDs 10 and 10'. When the power switch, also not shown, of the supply circuit is closed, the external power line 100 applies a prescribed working voltage to the FDD 10. We have herein shown the internal power line 102 as being connected to the disk motor drive and control circuit 54, head motor drive circuit 60, head motor control circuit 62, and read/write circuit 68. All these circuits 54, 60, 62 and 68 are therefore powered on and off by the power control switch 98. It will also be noted that the external power line 100 is connected directly to the interface 56 and sensor control circuit 92. These components 56 and 92 are therefore powered directly from the external power line 100, regardless of whether the power control switch 98 is open or closed.

Figure 5:
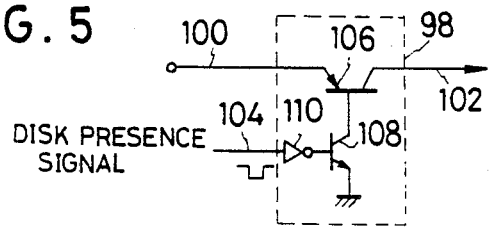
FIG. 5 is a schematic electrical diagram showing in detail a practical example of the power control switch built into each FDD of the data transfer system of FIG. 1 in accordance with our invention.

FIG. 5 shows an example of construction the power control switch 98 may take in practice. A switching transistor 106 is connected between external power line 100 and internal power line 102. For the on/off control of this transistor another transistor 108 is connected between the base of the first recited transistor and ground. The second transistor 108 has its base connected to the actuating signal line 104 to be actuated by the DISK PRESENCE signal from the sensor control circuit 92. The power circuit switch 98 must close when the DISK PRESENCE signal is low in the illustrated embodiment. Toward this end a NOT circuit 110 is connected to the base of the second transistor 108 for inverting the DISK PRESENCE signal before its application to the second transistor. Thus, whenever the DISK PRESENCE signal goes low, the second transistor 108 becomes conductive and so causes conduction through the first transistor 106 for the application of the supply voltage to the circuits 54, 60, 62 and 68.

We have so far studied the construction of the first FDD 10, which is interfaced with the host equipment 12 via the signal lines 58, 64, 66, 70, 72, 74 and 96. An additional line, not shown, connects the controller 16 to the FDD 10 for the delivery of the noted WRITE GATE signal to the NOR gate 82, FIG. 4, of the read/write circuit 68. The data transfer system of this class usually has still another line, also not shown, for the delivery of an IN USE signal to each FDD. The IN USE signal represents whether each FDD is in use for data transfer or not.

The second FDD 10' is likewise interfaced with the host equipment 12 via signal lines 58', 64', 66', 70', 72', 74', 96', etc., which correspond to the signal lines indicated by like reference numerals between first FDD 10 and host equipment 12. At 100' is shown an external power line conducting power to the second FDD 10'.

Operation

In the following operational of the multiple data transfer system, configured as in the foregoing, we will refer to the waveform diagram of FIG. 5. The following are the legends of the waveforms plotted in this figure:

(A) The state of the external power line 100 connected to the first FDD 10.

(B) The DISK PRESENCE signal delivered from the sensor control circuit 92 to the power control switch 98, as well as to the host equipment 12.

(C) The state of the internal power line 102 of the first FDD 10.

Figure 6:
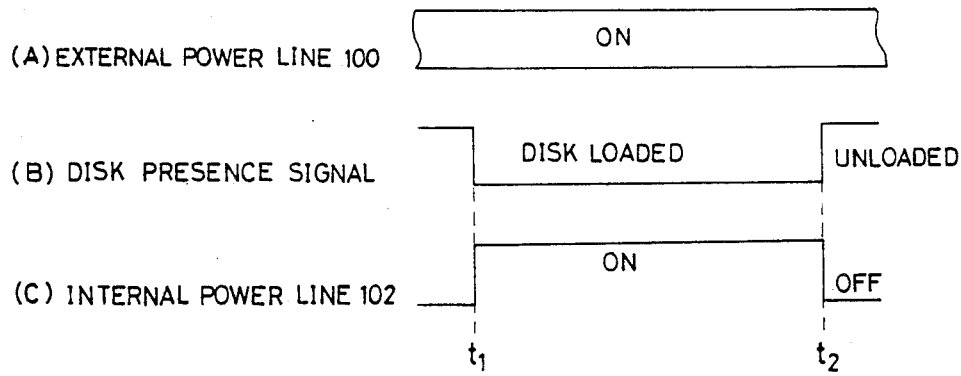
FIG. 6, consisting of (A)-(C), is a diagram plotting the waveforms appearing in various parts of the FIG. 1 system, as well as the states of the power lines of that system, the diagram being useful in explaining the operation of the FIG. 1 system.

We have further indicated in FIG. 1 the lines where the waveforms of FIG. 6 appear, by the associated letters A through E. Reference may therefore be had to both FIGS. 1 and 6, unless otherwise notified, for a better understanding of the operational description.

The external power line 100 conducts power to the first FDD 10, as at (A) in FIG. 6, as the unshown power switch of the complete data transfer system is closed. However, as long as the power control switch 98 in accordance with our invention is held open, the supply voltage will be impressed only to the interface 56 and sensor control circuit 92 of the FDD 10, and not to the disk motor control and drive circuit 54, head motor drive circuit 60, head motor control circuit 62, and read/write circuit 68, thereby avoiding waste of energy.

Upon insertion of the disk cartridge 18 in the entrance slot 28, FIG. 2, of the FDD 10 at a moment t1 in time, the cartridge will intercept the radiation from the light source 88 and prevents the same from falling on the photodetector 90. Thereupon the DISK PRESENCE signal from the sensor control circuit 92 will go low as at (B) in FIG. 6. The low DISK PRESENCE signal is applied to the power control switch 98 to close the same, as at (C) in FIG. 6. Now the disk motor control and drive circuit 54, head motor drive circuit 60, head motor control circuit 62, and read/write circuit 68 are all powered through the power control switch 98. The first FDD 10 may then be used for data transfer in the usual manner. It is to be noted that the sensor control circuit 92 is connected directly to the external power line 100 and so has been powered before the closure of the power control switch 98.

FIG. 6 shows the disk cartridge 18 to be withdrawn from the FDD 10 at a subsequent moment t2 upon completion of reading or writing. Then the DISK PRESENCE signal from the sensor control circuit 92 goes high, as at (B) in FIG. 6. Consequently the power control switch 98 re-opens, as at (C) in FIG. 6, to disconnect the disk motor control and drive circuit 54, head motor drive circuit 60, head motor control circuit 62, and read/write circuit 98 from the external power line 100. Since the power switch of the complete data transfer system is still assumed to be held closed, power is saved again by automatically re-opening the power control switch 98 upon withdrawal of the disk cartridge 18. Furthermore, even if the MOTOR ON signal, delivered from the host equipment 12 to the disk motor control and drive circuit 54 by way of the line 58, remains low after the moment t2, the disk motor 20 does not rotate because the disk motor control and drive circuit is disconnected from the external power line 100.

The operation of the second FDD 10' is identical with that of the first FDD 10 described above. The selected components of the second FDD 10' are powered only when a disk cartridge is loaded in position therein.

Although we have already set forth the advantages gained by our invention, we may restudy in further detail the particular advantages of the illustrated data transfer system after having thus fully disclosed its construction and operation. The advantages are:

1. The power consumption of each of the daisy chained FDDs, while it is standing by for data transfer with the power switch of the complete system closed, can be reduced to approximately one third or even one fourth that of the prior art. This power saving capability will manifest itself as an even greater advantage when the invention is applied to battery powered systems.

2. The power control switch 98 does not require manual activation, nor is the provision of any particular switch activating means necessary other than the actuating signal line 104.

3. The interface 56 and sensor control circuit 92 of each FDD are connected directly to the external power supply means, instead of being connected to the power control switch 98, so that preparation for reading or writing takes place immediately upon closure of the system power switch. Accordingly, when the disk cartridge 18 is loaded in position, each FDD will start data transfer with little or no delay.

Second Form

Figure 7:
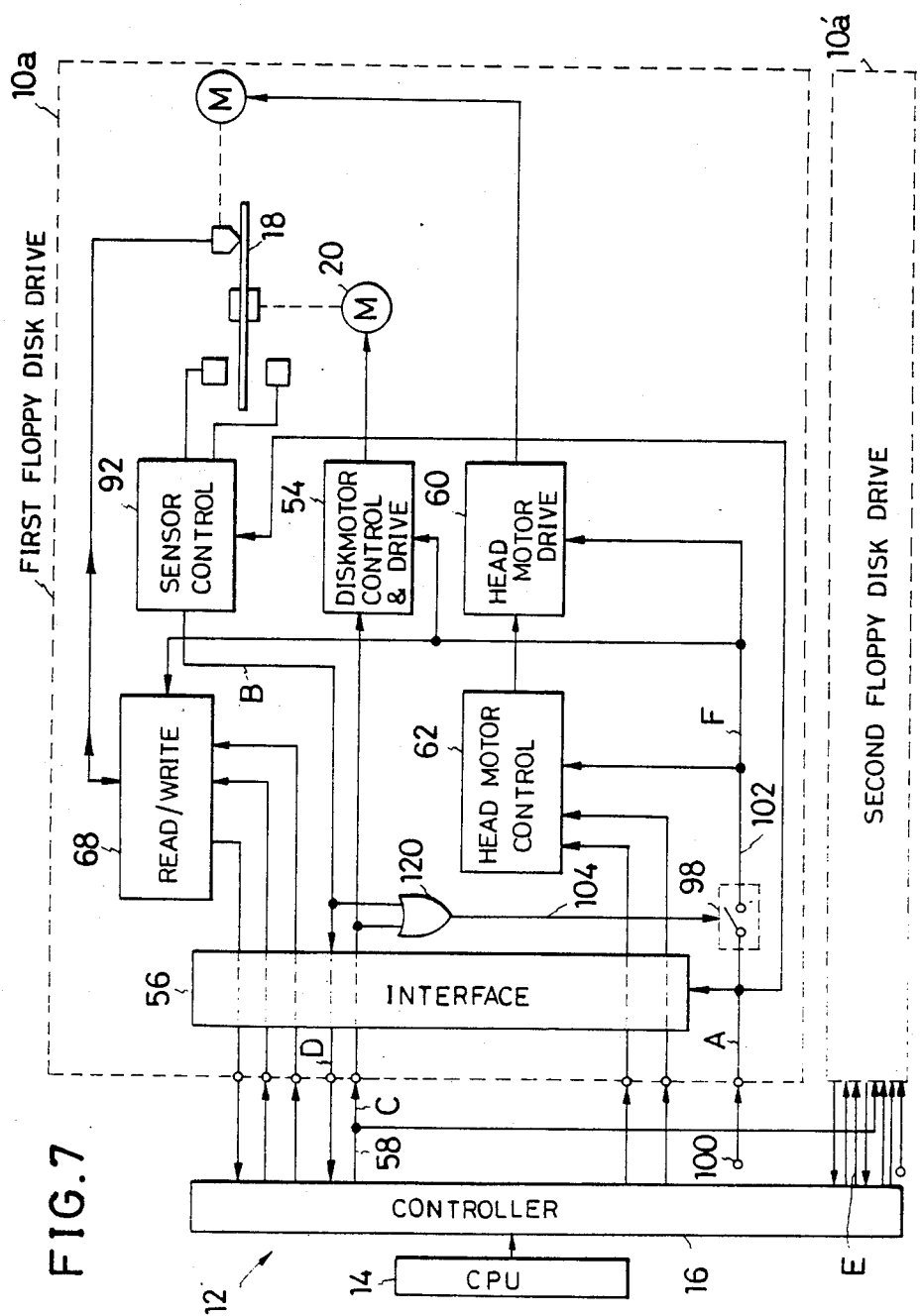
FIG. 7 is a block diagram of another preferred form of the data transfer system in accordance with our invention, also comprising a plurality of daisy chained FDDs, each FDD having a power control switch actuated by both DISK PRESENCE signal and MOTOR ON signal.

FIG. 7 shows another preferred form of the data transfer apparatus in accordance with the invention, also having two FDDs 10a and 10a' daisy chained to the host equipment 12 comprising the CPU 14 and controller 16. A comparison of FIG. 7 with FIG. 1 will reveal that this second embodiment differs from the first only in that each of the FDDs 10a and 10a' additionally comprising a two input OR gate 120 having its output connected to the power control switch 98 via the actuating signal line 104. The OR gate 120 has a first input connected to the sensor control circuit 92 to receive the DISK PRESENCE signal therefrom, and a second input connected via the interface 56 to the signal output line 58 of the host equipment 12 to receive the MOTOR ON signal therefrom. Thus, when either of the disk presence and MOTOR ON signals is high, so is the output from the OR gate 120. The high output from the OR gate 120 holds the power control switch 98 open. The power control switch 98 closes only when the output from the OR gate 120 goes low.

The other constructional details of the FIG. 7 data transfer system are as set forth already in connection with FIGS. 1 through 5.

Operation of Second Form

Figure 8:
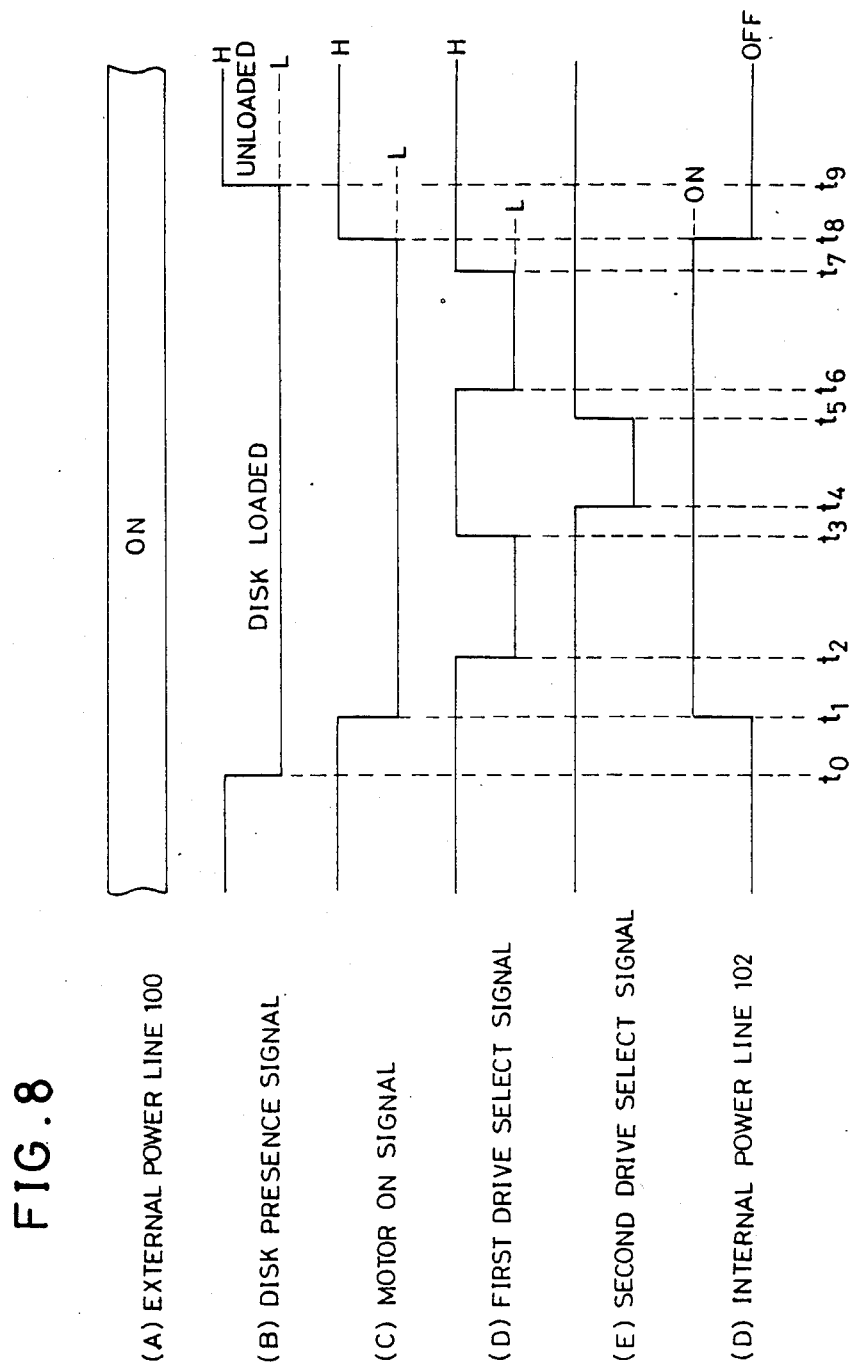
FIG. 8 is a waveform diagram useful in explaining the operation of the FIG. 7 system.

We will refer to the waveform diagram of FIG. 8 for the operational description of the FIG. 7 embodiment. Depicted in FIG. 8 are, from top to bottom:

(A) The state of the external power line 100 connected to the first FDD 10a.

(B) The DISK PRESENCE signal applied from the sensor control circuit 92 to the OR gate 120, as well as to the host equipment 12.

(C) The MOTOR ON signal applied from the host equipment 12 to the OR gates 120, as well as to the disk motor control and drive circuits 54, of both FDDs 10a and 10a'.

(D) The first DRIVE SELECT signal applied from the host equipment 12 to the read/write circuit 68 of the first FDD 10a (see FIG. 4).

(E) The second DRIVE SELECT signal applied from the host equipment 12 to the read/write circuit of the second FDD 10a'.

(F) The state of the internal power line 102 connecting the power control switch 98 to the selected components of the first FDD 10a.

As with the first embodiment we have indicated in FIG. 7 the lines on which the waveforms of FIG. 8 appear, by the associated letters A through F.

FIG. 8(A) indicates that the power switch of the complete data transfer system is held closed throughout the period under consideration. The disk cartridge 18 is loaded in position in the FDD 10a at a moment t0 in time, with the result that the DISK PRESENCE signal goes low as at (B) in FIG. 8. Before this moment t0 the output from the OR gate 120 has been high, holding the power control switch 98 open. The internal power line 102 has therefore been disconnected from the external power line 100, as at (F) in FIG. 8, holding the selected components 54, 60, 62 and 68 of the first FDD 10a unenergized. Only the interface 56 and sensor control circuit 92 have been powered directly from the external power line 100.

The MOTOR ON signal is assumed to go low at a moment t1 following the moment t0. Accordingly, even though the DISK PRESENCE signal goes low at the moment t0, the output from the OR gate 120 remains high at that moment, holding the power control switch 98 open.

As the MOTOR ON signal goes low at the moment t1, the two inputs to the OR gate 120 are both low, so that its output also goes low. The low output from the OR gate 120 closes the power control switch 98 as at (F) in FIG. 8, resulting in the energization of the disk motor control and drive circuit 54, head motor drive circuit 60, head motor control circuit 62, and read/write circuit 68. The powered disk motor control and drive circuit 54 immediately sets the disk motor 20 into rotation since the MOTOR ON signal is low.

The first DRIVE SELECT signal is shown to be low from moment t2 to moment t3 at (D) in FIG. 8. During this low period of the first DRIVE SELECT signal the read/write circuit 68 of the first FDD 10a is conditioned to pass the incoming or outgoing data therethrough, as will be seen by referring back to FIG. 4.

The second DRIVE SELECT signal is shown to be low from moment t4 to moment t5 at (E) in FIG. 8. If the second FDD 10a' also has a disk cartridge loaded therein during this low period of the second DRIVE SELECT signal, the power control switch of the second FDD will be closed because the MOTOR ON signal, common to both FDDs 10a and 10a', is assumed to have been held low since the moment t1 as at (C) in FIG. 8. Further the disk motor of the second FDD 10a' will be in rotation during this period. The second FDD 10a' is therefore in condition for data transfer during the period from moment t4 to t5.

The first DRIVE SELECT signal is shown to be low again from moment t6 to moment t7 at (D) in FIG. 8. The first FDD 10a is of course conditioned for data transfer during this period.

As the common MOTOR ON signal goes high at a moment t8 as at (C) in FIG. 8, with the disk cartridge 18 still held loaded in the FDD, the power control switch 98 opens as at (F) in FIG. 8. The disk cartridge 18 is shown withdrawn at a later moment t9. It is to be noted that, in this second embodiment, the power control switch 98 opens when the MOTOR ON signal goes high, even though the disk cartridge is still held loaded in the FDD.

Possibly, notwithstanding the showing of FIG. 8, the disk cartridge 18 may be withdrawn from the first FDD 10a before the moment t8, when the MOTOR ON signal is still low. In that case the DISK PRESENCE signal will go high while the MOTOR ON signal is low, with the result that the power control switch 98 opens. Power can then be saved as the disk motor 20 is set out of rotation even though the MOTOR ON signal is low.

It will have been seen that the FIG. 7 embodiment attains a still higher degree of power economy than the FIG. 1 embodiment. This advantage is gained by the on/off control of the power control switch 98 by both DISK PRESENCE signal and MOTOR ON signal, instead of by the DISK PRESENCE signal only as in the FIG. 1 embodiment. Additional advantages are as enumerated above in conjunction with the FIG. 1 embodiment.

Third Form

Figure 9:
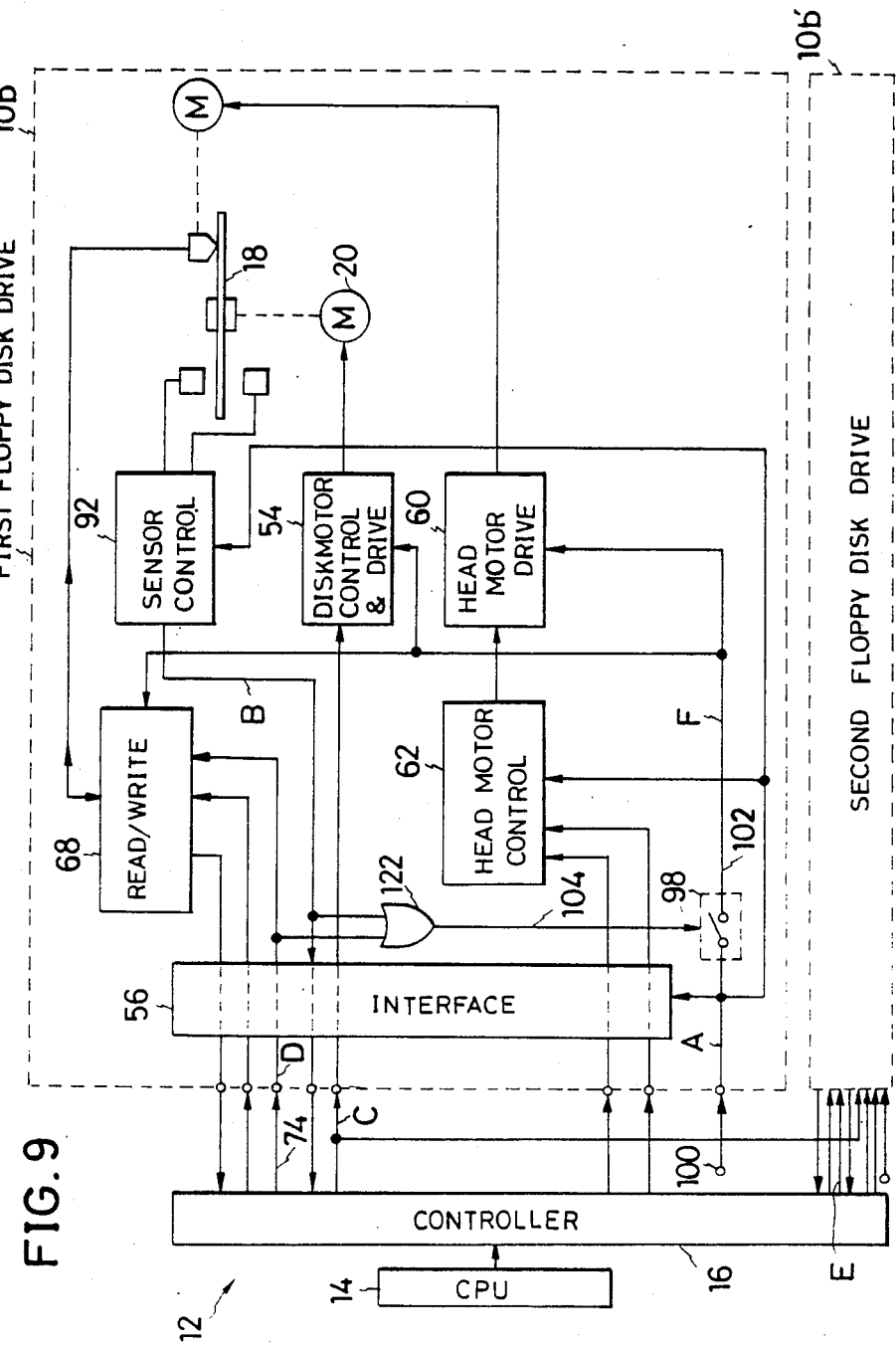
FIG. 9 is a block diagram of still another preferred form of the data transfer system in accordance with our invention, also comprising a plurality of daisy chained FDDs, each FDD having a power control switch actuated by both DISK PRESENCE signal and DRIVE SELECT signal.

FIG. 9 is an illustration of a third preferred embodiment of our invention, also comprising two FDDs 10b and 10b' daisy chained to the host equipment 12 comprising the CPU 14 and controller 16. Each of the daisy chained FDDS 10b and 10b' differs from those of the foregoing embodiments in having a two input OR gate 122 having its output connected to the power control switch 98 by way of the actuating signal line 104. The OR gate 122 has a first input connected to the sensor control circuit 92 to receive the DISK PRESENCE signal therefrom, and a second input connected via the interface 56 to the signal output line 74 of the host equipment 12 to receive the DRIVE SELECT signal therefrom. Thus, when either of the DISK PRESENCE and DRIVE SELECT signals is high, so is the output from the OR gate 122, holding the power control switch 98 open.

Another difference of the FIG. 9 embodiment from those of FIGS. 1 and 7 is that the head motor control circuit 62 is connected directly to the external power line 100, instead of via the power control switch 98 as in the preceding embodiments.

The other constructional details of the FIG. 9 embodiment are identical with those of FIGS. 1 and 7.

Operation of Third Form

Figure 10:
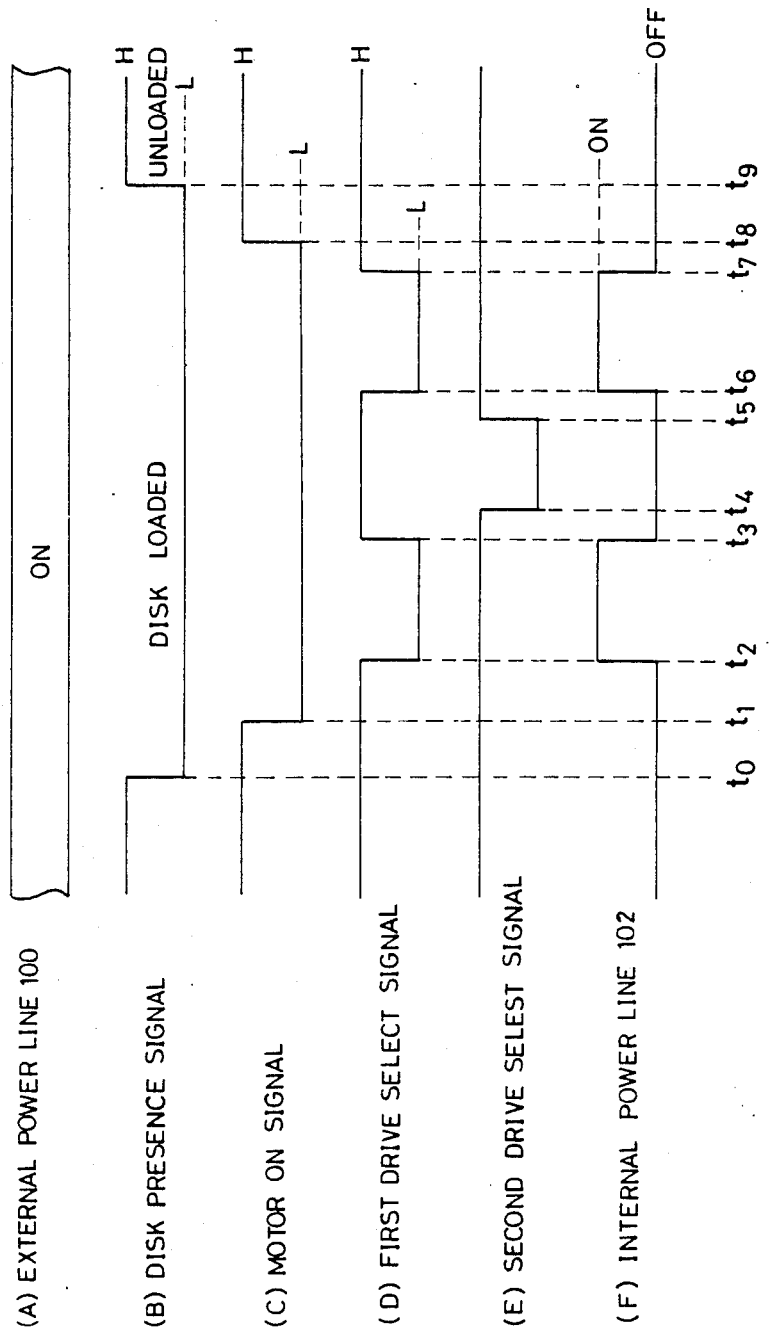
FIG. 10, consisting of (A)-(F), is a waveform diagram useful in explaining the operation of the FIG. 9 system.

Reference is directed also to the waveform diagram of FIG. 10 for the operational description of the FIG. 9 embodiment. The signals whose waveforms appear in FIG. 10 are the same as those whose waveforms appear in FIG. 8. We have also indicated in FIG. 9 the lines where these signal waveforms appear, by the associated letters A through F.

In this embodiment, too, the power control switch 98 remains open until the DISK PRESENCE signal goes low at a moment t0 upon loading of the disk cartridge 18 in position in the first FDD 10b, as at (B) in FIG. 10, even though the power switch of the complete system has been closed as at (A) in FIG. 10. The nonconducting state of the internal power line 102 is depicted as (F) in FIG. 10. The MOTOR ON signal is shown to go low at a moment t1 as at (C) in FIG. 10. However, the disk motor control and drive circuit 54 is not yet able to energize the disk motor 20 as the power control switch 98 remains open at the moment t1.

The first DRIVE SELECT signal is shown to be low from moment t2 to moment t3 and from moment t6 to moment t7 as at (D) in FIG. 10. Both inputs to the OR gate 122 of the first FDD 10b are low during these periods, so that the output from the OR gate is also low, closing the power control switch 98 as at (F) in FIG. 10. Since the MOTOR ON signal is also low during these periods, the disk motor control and drive circuit 54 energizes the disk motor 20.

The second DRIVE SELECT signal is shown to be low from moment t4 to moment t5, as at (E) in FIG. 10. If then the second FDD 10b' already has had a disk cartridge loaded therein, both inputs to the OR gate of the second FDD are low during that period. The output from the OR gate is also low, so that the power control switch of the second FDD is closed from moment t4 to moment t5. The MOTOR ON signal at (C) in FIG. 10 is common to both FDDs 10b and 10b'; therefore, the disk motor of the second FDD rotates during this period.

The power control switch 98 of the first FDD 10b opens at a moment t7 when the first DRIVE SELECT signal finally goes high, even though the MOTOR ON signal remains low until a later moment t8, and the DISK PRESENCE signal remains low until a still later moment t9, thereby saving power.

The disk cartridge 18 may be withdrawn from the first FDD 10b before the moment t7, when the first DRIVE SELECT signal is still low. Since then the DISK PRESENCE signal goes high, the output from the OR gate 122 also goes high. Thus the power control switch 98 becomes opened even though the MOTOR ON and DRIVE SELECT signals are both low, again realizing a substantial saving of power.

The FIG. 9 embodiment offers an additional advantage arising from the the direct connection of the head motor control circuit 62 to the external power line 100. The up/down counter included in the head motor control circuit 62 can therefore hold in storage the information concerning the position of the transducer head 32 on the magnetic disk without being affected by the opening and closing of the power control switch 98.

Fourth Form

Figure 11:
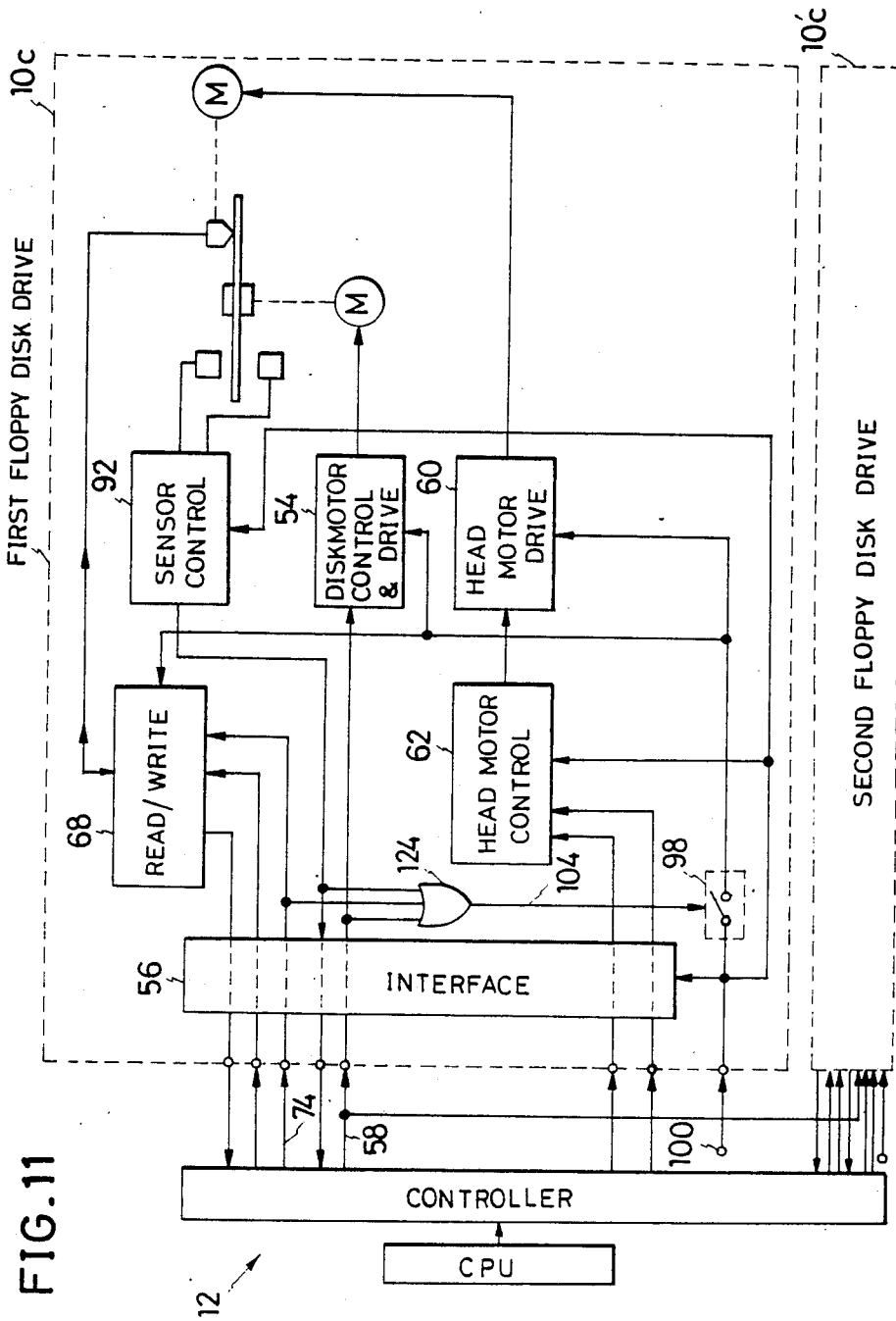
FIG. 11 is a block diagram of a further preferred form of the data transfer system in accordance with our invention, also comprising a plurality of daisy chained FDDs, each FDD having a power control switch actuated by DISK PRESENCE, MOTOR ON, and DRIVE SELECT signals.

In a further preferred embodiment of our invention illustrated in FIG. 11, two FDDs 10c and 10c' are shown daisy-chained to the host equipment 12. Each of the FDDs 10c and 10c' features a three input OR gate 124 having its output connected to the power control switch 98 by way of the actuating signal line 104. The OR gate 124 has a first input connected to the sensor control circuit 92 to receive the DISK PRESENCE signal therefrom, a second input connected via the interface 56 to the signal output line 58 of the host equipment 12 to receive the MOTOR ON signal therefrom, and a third input connected via the interface to the signal output line 74 of the host equipment to receive the DRIVE SELECT signal therefrom.

The power control switch 98 is connected only to the disk motor control and drive circuit 54, head motor drive circuit 60, and read/write circuit 68 as in the FIG. 9 embodiment. The interface 56, head motor control circuit 62, and sensor control circuit 92 are connected directly to the external power line 100. The data transfer system of FIG. 11 is identical in the other constructional details with that of FIGS. 1 through 5.

When all of the DISK PRESENCE, MOTOR ON and DRIVE SELECT signals go low, so does the output from the OR gate 124, with the result that the power control switch 98 becomes closed. The other details of operation, as well as the advantages, of this embodiment are considered self evident from the description of the foregoing embodiments.

Fifth Form

Figure 12:
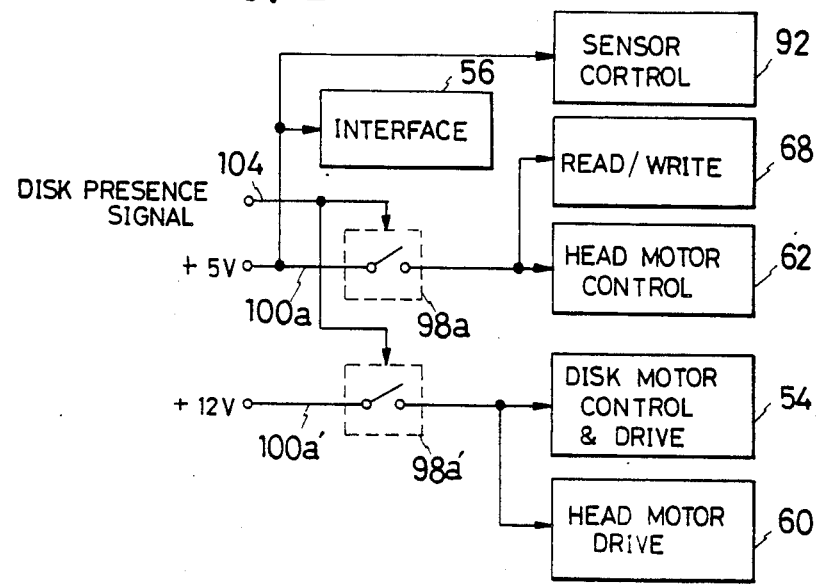
FIG. 12 is a block diagram showing part of a slightly modified FDD in accordance with our invention.

FIG. 12 shows a slight modification of the FIG. 1 embodiment, wherein the invention is applied to a data transfer system having two separate external power lines 100a and 100a' for the application of different supply voltages to two groups of components in each FDD. The first power line 100a is intended for the application of a five volt supply voltage to the interface 56, head motor control circuit 62, read/write circuit 68, and sensor control circuit 92. The second power line 100a' is intended for the application of a 12 volt supply voltage to the disk motor control and drive circuit 54 and head motor drive circuit 60.

In this application we suggest the provision of a first power control switch 98a between the first power line 100a and the head motor control circuit 62 and read/write circuit 68, and of a second power control switch 98a' between the second power line 100a' and the disk motor drive and control circuit 54 and head motor drive circuit 60. As taught by the FIG. 1 embodiment in particular, the interface 56 and sensor control circuit 92 are both connected directly to the first power line 100a.

For the on/off control of the power control switches 98a and 98a' the sensor control circuit 92 may be connected thereto by way of the actuating signal line 104, as in the FIG. 1 embodiment. It is of course possible to activate these power control switches in accordance with the teachings of the FIG. 7, 9 or 11 embodiment. The other details of construction and operation are substantially as set forth above in connection with the foregoing embodiments.

Sixth Form

Figure 13:
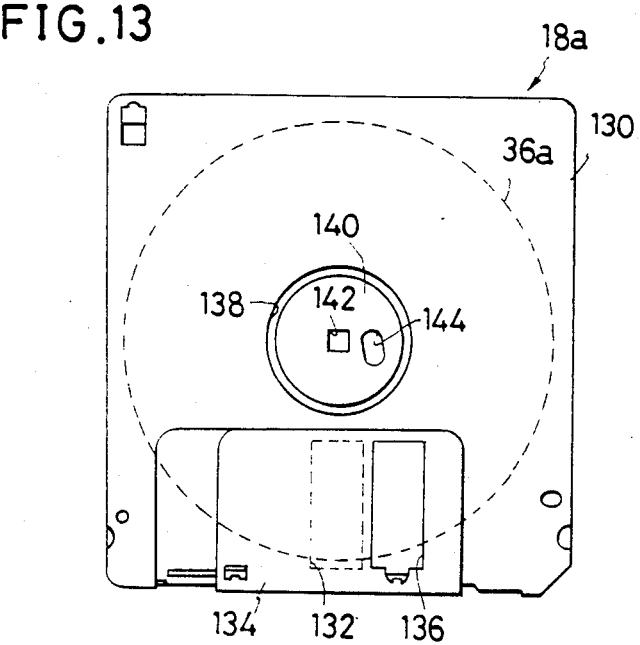
FIG. 13 is a plan view of another example of record medium suitable for use with the data transfer apparatus of our invention.

In FIG. 13 is shown another preferred form of record medium that finds use with the data transfer apparatus of our invention, in substitution for the disk cartridge 18 of FIG. 3. Generally designated 18a, the alternative record medium also has a flexible magnetic disk 36a, with a diameter of approximately 3.5 inches (86 millimeters), housed in an envelope 130 which is molded of synthetic resin material and which has greater rigidity than the envelope 38 of the disk cartridge 18. The envelope 130 has a slot 132 formed in at least one side thereof to expose a radial portion of the disk 36a for data transfer with the transducer head. The slot 132 is normally closed by a cover 134, itself having a slot 136 formed thereon, slidably mounted on the envelope 130. The slidable cover 134 is sprung and normally held in the illustrated position on the envelope 130, with the slot 136 therein out of register with the slot 132 in the envelope. In use, then, the cover 134 is slid over the envelope 130 against the spring pressure to bring the slot 136 into register with the slot 132.

The envelope 130 has further formed therein a central aperture 138 to expose a central portion of the magnetic disk 36a. This disk has a rigid hub 140 at its exposed central portion. In the form of a metal disk, the hub 140 is to be magnetically attached to a drive element, not shown, of the data transfer apparatus. The hub 140 has formed therein a central square opening 142 and eccentric elliptical opening 144 for the insertion of a spindle and drive pin, both not shown, of the data transfer apparatus.

The data transfer apparatus for use with the disk cartridge 18a must have its disk drive mechanism modified accordingly. For instance, the clamp 24 of FIG. 1 is unnecessary as the magnetic disk 36a has its metal hub 140 magnetically attached to the drive element for joint rotation therewith.

Possible Modifications

Although we have shown and described our invention in terms of specific embodiments thereof and as adapted for a multiple data transfer system having a plurality of daisy chained FDDs, it is understood that these are by way of example only and not to impose limitations upon the invention. A variety of modifications or alterations will occur to one skilled in the art to conform to design preferences or to the specific requirements of each application of the invention, without departing from the scope of our invention. The following is a brief list of such possible modifications:

1. In cases where two or more selected components of each FDD are to be selectively connected to the external power line in accordance with the teachings of our invention, two or more power control switches may be provided one for each selected component, instead of providing a single power control switch for all the selected components as in the illustrated embodiments.

2. In the embodiments of FIGS. 7, 9 and 11 the OR gate 120, 122 or 124 becomes unnecessary if a series connection of two or three power control switches is provided between external power line 100 and internal power line 102. For instance, in the FIG. 7 embodiment, one of the two serially connected power control switches may be actuated by the DISK PRESENCE signal, and the other switch by the MOTOR ON signal.

3. Since the power control switch is under the control of the MOTOR ON signal in the embodiments of FIGS. 7 and 11, the disk motor control and drive circuit need not respond to the MOTOR ON signal as it is energized and deenergized through the power control switch. Thus the disk motor control and drive circuit may not be furnished with the conventional switch actuated by the MOTOR ON signal.

4. The presence or absence of a record medium in each FDD may be sensed by a miroswitch, instead of by the optical sensor assembly as in the illustrated embodiments.

5. Record media for use with the data transfer apparatus of our invention may not necessarily be magnetic disks but may be optical disks. The illustrated construction of the apparatus may then be correspondingly modified for optical data transfer with such disks.

We claim:

1. A data transfer apparatus for use with a disklike record medium such as a flexible magnetic disk, the record medium being loaded in the apparatus for data transfer and being unloaded therefrom upon completion of data transfer, the apparatus comprising:
    (a) a first motor for imparting rotation to the loaded record medium in a preassigned data transfer position within the apparatus;
    (b) a first drive circuit for controllably driving the first motor;
    (c) a transducer arranged for data transfer with the record medium in the data transfer position;
    (d) a second motor for moving the transducer radially of the record medium;
    (e) a second drive circuit for controllably driving the second motor;
    (f) a read/write circuit connected to the transducer for processing data transferred between the transducer and the record medium;
    (g) power supply means;
    (h) sensor means for sensing the loading and unloading of the record medium and producing a DISK PRESENCE signal indicative of the presence or absence of the record medium in the apparatus, the sensor means being connected directly to the power supply means to be powered thereby;
    (i) power control switch means connected between the power supply means an at least one of the first drive circuit and the second drive circuit and the read/write circuit, the power control switch means being further connected to the sensor means for actuation by the DISK PRESENCE signal depending upon whether the record medium is loaded in or loaded from the apparatus, the power control switch means being effective to hol said at least one of the first drive circuit and the second drive circuit and the read/write circuit disconnected from the power supply means when the record medium is unloaded from the apparatus; and
    (j) a data select gate, included in the read/write circuit, for selectively allowing the passage of the data therethrough; and
    (k) signal supply means for supplying a DRIVE SELECT signal for the data through the data select gate, the DRIVE SELECT signal having a first prescribed state for causing the data select gate to pass the data and a second prescribed state for causing the data select gate to inhibit the passage of the data;
    (l) the power control switch means being further connected to the signal supply means for actuation by the DRIVE SELECT signal depending upon whether the DRIVE SELECT signal is in the first or second prescribed state, the power control switch means being effective to hold said at least one of the first drive circuit and the second drive circuit and the read/write circuit disconnected from the power supply means when the record medium is unloaded from the apparatus and when the DRIVE SELECT signal is in the second prescribed state.

2. The data transfer apparatus as recited in claim 1, wherein the power control switch means is closed by the DISK PRESENCE signal upon loading of the record medium in the apparatus and is opened by the DISK PRESENCE signal upon unloading of the record medium from the apparatus.

3. The data transfer apparatus as recited in claim 1, further comprising:
    (a) signal supply means for supplying a MOTOR ON signal for the on/off control of the first motor, the MOTOR ON signal having a first prescribed state for holding the first motor in rotation and a second prescribed state for holding the first motor out of rotation;
    (b) the power control switch means being further connected to the signal supply means for actuation by the MOTOR ON signal depending upon whether the MOTOR ON signal is in the first or second prescribed state, the power control switch means being effective to hold said at least one of the first drive circuit and the second drive circuit and the read/write circuit disconnected from the power supply means when the record medium is unloaded from the apparatus and when the MOTOR ON signal is in the second prescribed state.

4. The data transfer apparatus as recited in claim 1, wherein the first and second drive circuits and the read/write circuit are all connected to the power supply means via the power control switch means.

5. The data transfer apparatus as recited in claim 1, wherein the power supply means comprises:
    (a) first power supply means for applying a first supply voltage to the first and second drive circuits; and
    (b) second power supply means for applying a second supply voltage, different from the first supply voltage, to the read/write circuit and the sensor means;
and wherein the power control switch means comprises:
    (a) a first power control switch connected between the first power supply means and the first and second drive circuits; and
    (b) a second power control switch connected between the second power supply means and the read/write circuit.

6. A data transfer apparatus for use with a disklike record medium such as a flexible magnetic disk, the record medium being loaded in the apparatus for data transfer and being unloaded therefrom upon completion of data transfer, the apparatus comprising:
    (a) a first motor for imparting rotation to the loaded record medium in a preassigned data transfer position within the apparatus;
    (b) a first drive circuit for controllably driving the first motor;
    (c) a transducer arranged for data transfer with the record medium in the data transfer position;
    (d) a second motor for moving the transducer radially of the record medium;
    (e) a second drive circuit for controllably driving the second motor;

(f) a read/write circuit connected to the transducer for processing data transferred between the transducer and the record medium;

(g) power supply means;

(h) sensor means for sensing the loading and unloading of the record medium and producing a DISK PRESENCE signal indicative of the presence or absence of the record medium in the apparatus, the sensor means being connected directly to the power supply means to be powered thereby;

(i) power control switch means connected between the power supply means an at least one of the first drive circuit and the second drive circuit and the read/write circuit, the power control switch means being further connected to the sensor means for actuation by the DISK PRESENCE signal depending upon whether the record medium is loaded in or loaded from the apparatus, the power control switch means being effective to hol said at least one of the first drive circuit and the second drive circuit and the read/write circuit disconnected from the power supply means when the record medium is unloaded from the apparatus; and (j) a data select gate, included in the read/write circuit, for selectively allowing the passage of the data therethrough;

(k) first signal supply means for supplying a DRIVE SELECT signal for the selective passage of the data through the data select gate, the DRIVE SELECT signal having a first prescribed state for causing the data select gate to pass the data and a second prescribed state for causing the data select gate to inhibit the passage of the data; and (l) second signal supply means for supplying a MOTOR ON signal for the on/off control of the first motor, the MOTOR ON signal having a first prescribed state for holding the first motor in rotation and a second prescribed state for holding the first motor out of rotation;

(m) the power control switch means being further connected to the first and second signal supply means for actuation by the DRIVE SELECT signal depending upon whether the DRIVE SELECT signal is in the first depending upon whether the MOTOR ON signal depending upon whether the MOTOR ON signal is in the first or second state, the power control switch means being effective to hold said at least one of the first drive circuit and the second drive circuit and the read/write circuit disconnected from the power supply means when the record medium is unloaded from the apparatus and when the DRIVE SELECT and MOTOR ON signals are both in the second prescribed state.

7. A multiple data transfer system having a plurality of disk drive daisy chained to host equipment to be controlled thereby, each disk drive being for use with a disklike record medium such as a flexible magnetic disk, the record medium being loaded in each disk drive for data transfer and being unloaded in each disk drive for data transfer and being unloaded therefrom upon completion of data transfer, each disk drive comprising:

(a) a first motor for imparting rotation to the loaded record medium in a preassigned data transfer position within the disk drive;

(b) a first drive circuit for controllably driving the first motor;

(c) a transducer arranged for data transfer with the record medium in the data transfer position;

(d) a second motor for moving the transducer radially of the record medium;

(e) a second drive circuit for controllably driving the second motor;

(f) a read/write circuit connected to the transducer for processing data transferred between the transducer and the record medium;

(g) power supply means;

(h) sensor means for sensing the loading and unloading of the record medium and producing a DISK PRESENCE signal indicative of the presence or absence of the record medium in the disk drive, the sensor means being connected directly to the power supply means to be powered thereby;

(i) power control switch means connected between the power supply means and at least one of the first drive circuit and the second drive circuit and the read/write circuit, the power control switch means being further connected to the sensor means for actuation by the DISK PRESENCE signal depending upon whether the record medium is loaded in or unloaded from the disk drive, the power control switch means being effective to hold said at least one of the first and second drive circuits and the read/write circuit disconnected from the power supply means when the record medium is unloaded from the disk drive; and (j) wherein the host equipment delivers a plurality of DRIVE SELECT signals to the read/write circuits of the respective disk drives for the selective passage of the data therethrough, each DRIVE SELECT signal having a first prescribed state for causing the read/write circuit of the associated disk drive to pass the data and a second prescribed state for causing the read/write circuit to inhibit the passage of the data, and wherein the power control switch means of each disk drive is further connected to the host equipment for actuation by the associated DRIVE SELECT signal depending upon whether the DRIVE SELECT signal is in the first or second prescribed state, the power control switch means being effective to hold said at least one of the first and second drive circuits and the read/write circuit disconnected from the power supply means when the record medium is unloaded from the associated disk drive and when the associated DRIVE SELECT signal is in the second prescribed state.

8. The multiple data transfer system as recited in claim 7, wherein the host equipment delivers a common MOTOR ON signal to all the disk drives for the on/off control of the first drive motors, the MOTOR ON signal having a first prescribed state for holding the first motors in rotation and a second prescribed state for holding the first motors out of rotation, and wherein the power control switch means of each disk drive is further connected to the host equipment for actuation by the MOTOR ON signal depending upon whether the MOTOR ON signal is in the first or second prescribed state, the power control switch means being effective to hold said at least one of the first and second drive circuits and the read/write circuit disconnected from the power supply means when the record medium is unloaded from the associated disk drive and when the MOTOR ON signal is in the second prescribed state.

9. A multiple data transfer system having a plurality of disk drives daisy chained to host equipment to be controlled thereby, each disk drive being for use with a disklike record medium such as a flexible magnetic disk, the record medium being loaded in each disk drive for data transfer and being unloaded therefrom upon completion of data transfer, each disk drive comprising:

(a) a first motor for imparting rotation to the loaded record medium in a preassigned data transfer position within the disk drive;

(b) a first drive circuit for controllably driving the first motor;

(c) a transducer arranged for data transfer with the record medium in the data transfer position;

(d) a second motor for moving the transducer radially of the record medium;

(e) a second drive circuit for controllably driving the second motor;

(f) a read/write circuit connected to the transducer for processing data transferred between the transducer and the record medium;

(g) power supply means;

(h) sensor means for sensing the loading and unloading of the record medium and producing a DISK PRESENCE signal indicative of the presence or absence of the record medium in the disk drive, the sensor means being connected directly to the power supply means to be powered thereby;

(i) power control switch means connected between the power supply means and at least one of the first drive circuit and the second drive circuit and the read/write circuit, the power control switch means being further connected to the sensor means for actuation by the DISK PRESENCE signal depending upon whether the record medium is loaded in or unloaded from the disk drive, the power control switch means being effective to hold said at least one of the first and second drive circuits and the read/write circuit disconnected from the power supply means when the record medium is unloaded from the disk drive; and (j) wherein the host equipment delivers a common MOTOR ON signal to all the disk drives for the on/off control of the first drive motors, and a plurality of DRIVE SELECT signals to the read/write circuits of the respective disk drives for the selective passage of the data therethrough, the MOTOR ON signal having a first prescribed state for holding the first motors in rotation and a second prescribed state for holding the first motor out of rotation, each DRIVE SELECT signal having a first prescribed state for causing the read/write circuit of the associated disk drive to pass the dat and a second prescribed state for causing the read/write circuit to inhibit the passage of the data, and wherein the power control switch means of each disk drive is further connected to the host equipment for actuation by the MOTOR ON signal depending upon whether the MOTOR ON signal is in the first or second state, and by the associated DRIVE SELECT signal depending upon whether the DRIVE SELECT signal is in the first or second state, the power control switch means being effective to hold said at least one of the first and second drive circuits and the read/write circuit disconnected from the power supply means when the record medium is unloaded from the associated disk drive and when the MOTOR ON signal and the associated DRIVE SELECT signal are both in the second prescribed state.

* * * * *